(12) United States Patent
Stuart

(10) Patent No.: US 10,830,136 B2
(45) Date of Patent: Nov. 10, 2020

(54) FAN CASE FOR USE IN A TURBOFAN ENGINE, AND METHOD OF ASSEMBLING A TURBOFAN ENGINE

(71) Applicant: General Electric Company, Schenectady, NY (US)

(72) Inventor: Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 14/946,404

(22) Filed: Nov. 19, 2015

(65) Prior Publication Data
US 2017/0145916 A1    May 25, 2017

(51) Int. Cl.
| F02C 7/042 | (2006.01) |
| F02C 7/045 | (2006.01) |
| F02K 3/068 | (2006.01) |
| B64D 33/02 | (2006.01) |
| B64D 29/00 | (2006.01) |
| F02K 3/06  | (2006.01) |

(52) U.S. Cl.
CPC .............. *F02C 7/042* (2013.01); *B64D 29/00* (2013.01); *B64D 33/02* (2013.01); *F02C 7/045* (2013.01); *F02K 3/06* (2013.01); *F02K 3/068* (2013.01); *B64D 2033/0206* (2013.01); *F05D 2230/70* (2013.01); *F05D 2250/314* (2013.01); *F05D 2260/96* (2013.01); *Y02T 50/60* (2013.01)

(58) Field of Classification Search
CPC . F02C 7/042; F02K 3/06; F02K 3/068; B64D 33/02; B64D 29/02; B64D 2033/0206; F05D 2250/314
See application file for complete search history.

(56) References Cited

U.S. PATENT DOCUMENTS

| 3,933,327 A | * | 1/1976 | Cook .................... B64D 15/04 244/134 B |
| 4,220,171 A | | 9/1980 | Ruehr et al. |
| 4,484,856 A | * | 11/1984 | Patacca ................ F01D 21/045 138/110 |
| 4,534,167 A | | 8/1985 | Chee |
| 4,699,567 A | | 10/1987 | Stewart |
| 5,169,288 A | | 12/1992 | Gliebe et al. |

(Continued)

FOREIGN PATENT DOCUMENTS

| CN | 101898634 A | 12/2010 |
| CN | 104220728 A | 12/2014 |

(Continued)

OTHER PUBLICATIONS

Extended European Search Report and Opinion issued in connection with corresponding EP Application No. 16196840.9 dated Apr. 12, 2017.

(Continued)

*Primary Examiner* — David E Sosnowski
*Assistant Examiner* — Danielle M. Christensen
(74) *Attorney, Agent, or Firm* — Dority & Manning, P.A.

(57) ABSTRACT

A fan case for use in a turbofan engine is provided. The fan case includes an aft portion having a substantially cylindrical cross-sectional shape, and a forward portion extending from the aft portion. A cross-sectional shape of the forward portion progressively decreases in radial size as the forward portion extends from the aft portion.

14 Claims, 4 Drawing Sheets

(56) References Cited

U.S. PATENT DOCUMENTS

| | | | |
|---|---|---|---|
| 5,915,403 | A | 6/1999 | McConachie et al. |
| 6,206,631 | B1 | 3/2001 | Schilling |
| 6,371,411 | B1* | 4/2002 | Breer ................ F02C 7/047 244/134 B |
| 7,255,528 | B2* | 8/2007 | Stretton ............ F01D 21/045 415/119 |
| 8,092,169 | B2 | 1/2012 | Cloft et al. |
| 8,231,328 | B2 | 7/2012 | Reed |
| 8,297,912 | B2 | 10/2012 | Reed |
| 8,876,467 | B2* | 11/2014 | Riou ................ B64D 33/02 415/119 |
| 8,926,277 | B2 | 1/2015 | Walters |
| 2002/0047070 | A1 | 4/2002 | Breer et al. |
| 2005/0082112 | A1 | 4/2005 | Harrison |
| 2005/0089391 | A1* | 4/2005 | Stretton ............ F01D 21/045 415/9 |
| 2013/0227962 | A1 | 9/2013 | Bunel et al. |
| 2013/0283821 | A1 | 10/2013 | Gilson et al. |
| 2014/0023492 | A1 | 1/2014 | Lucas |
| 2014/0271169 | A1 | 9/2014 | James et al. |

FOREIGN PATENT DOCUMENTS

| | | |
|---|---|---|
| EP | 2 241 504 A2 | 10/2010 |
| WO | 2015/094594 A1 | 6/2015 |

OTHER PUBLICATIONS

First Office Action and Search issued in connection with corresponding CN Application No. 201611016288.7 dated Mar. 9, 2018.
Opinion Notice First Examination Corresponding to Chinese Application No. CN2016110162887 dated Mar. 9, 2018.

* cited by examiner

FAN CASE FOR USE IN A TURBOFAN ENGINE, AND METHOD OF ASSEMBLING A TURBOFAN ENGINE

BACKGROUND

The field of the disclosure relates generally to turbofan engines and, more particularly, to an elongated fan case for use in a turbofan engine.

At least some known gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a second drive shaft. The low-pressure turbine rotatably drives the fan through the second drive shaft.

Many modern commercial turbofan engines have a drooped inlet, which is angled relative to a centerline of the turbofan engine. For example, the drooped inlet is incorporated to facilitate matching the airflow upwash angle in front of the wing of an aircraft, in which the turbofan engine is attached, when the aircraft is traveling at cruise conditions. The angle of the drooped inlet is typically achieved by contouring the inner flow surface of a nacelle housing of the turbofan engine. Moreover, the drooped inlet is typically formed from a series of components such as a lipskin, inner and outer bondments or barrels having acoustic lining incorporated therein, and forward and aft bulkheads. However, space within the drooped inlet for receiving acoustic lining is becoming increasingly limited as nacelle housings are shortened to increase weight reduction and reduce drag.

BRIEF DESCRIPTION

In one aspect, a fan case for use in a turbofan engine is provided. The fan case includes an aft portion that is substantially cylindrical and axi-symmetric about a centerline of the turbofan engine, and a forward portion extending from the aft portion. A cross-sectional shape of the forward portion progressively decreases in radial size as the forward portion extends from the aft portion.

In another aspect, a turbofan engine is provided. The turbofan engine includes a nacelle housing, and a fan case coupled to the nacelle housing. The fan case includes an aft portion that is substantially cylindrical and axi-symmetric about a centerline of the turbofan engine, and a forward portion extending from the aft portion. A cross-sectional shape of the forward portion progressively decreases in radial size as the forward portion extends from the aft portion.

In yet another aspect, a method of assembling a turbofan engine is provided. The method includes providing a fan case that includes an aft portion that is substantially cylindrical and axi-symmetric about a centerline of the turbofan engine, and a forward portion extending from the aft portion. A cross-sectional shape of the forward portion progressively decreases in radial size as the forward portion extends from the aft portion. The method also includes coupling the forward portion of the fan case to a nacelle housing.

DRAWINGS

These and other features, aspects, and advantages of the present disclosure will become better understood when the following detailed description is read with reference to the accompanying drawings in which like characters represent like parts throughout the drawings, wherein.

Figure 1:
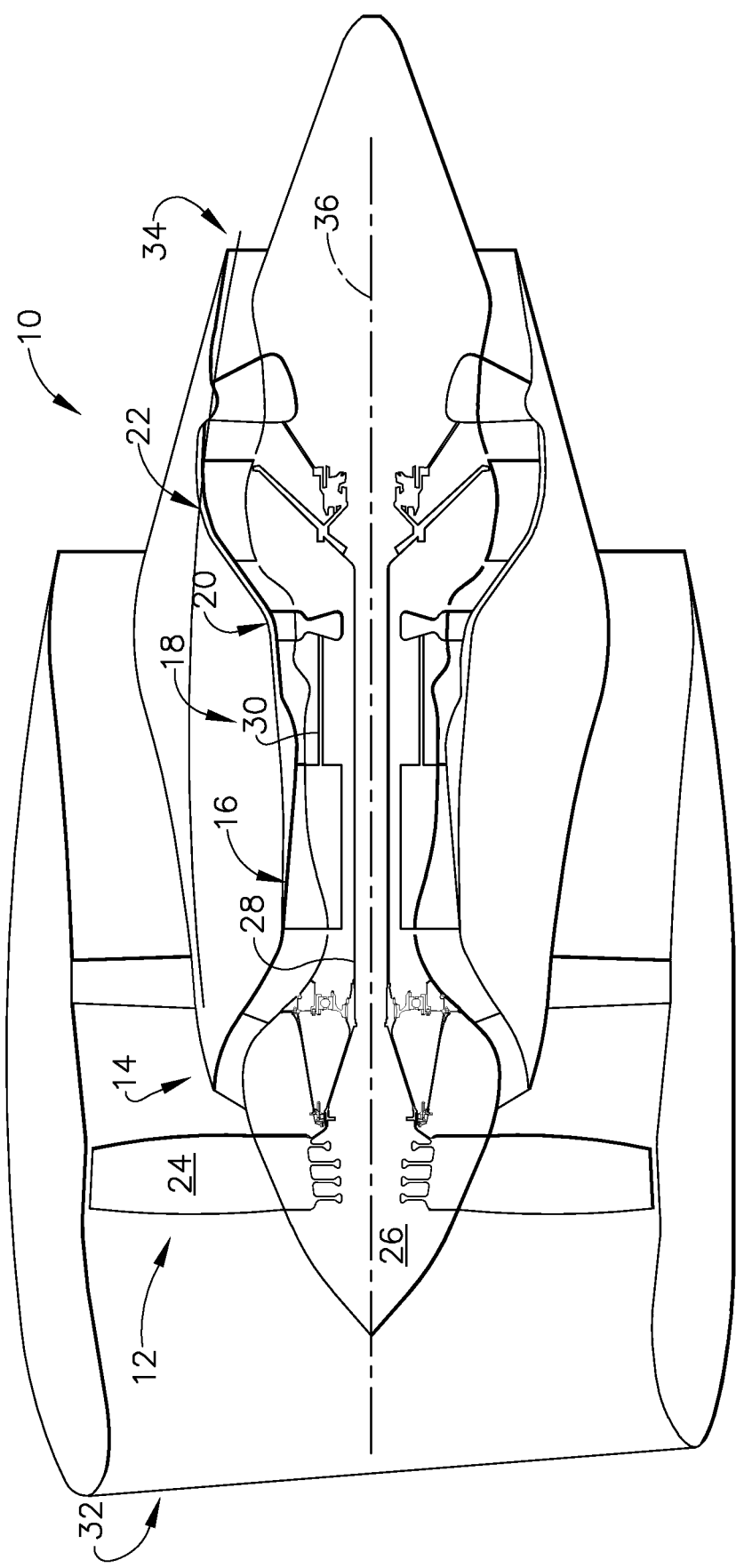
FIG. 1 is a schematic illustration of an exemplary turbofan engine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to turbine engines, such as turbofans, and methods of manufacturing thereof. More specifically, the turbofan engines described herein include an elongated fan case including a forward portion having a radially inner surface that defines a drooped inlet of the turbofan engine. Defining the drooped inlet of the turbofan engine with the inner flow surface of the fan case facilitates eliminating components from a nacelle housing coupled to the fan case that once defined the drooped inlet. The fan case inlet is thus more simplified and more symmetrical. As such, the length of the nacelle housing is reduced, thereby enabling a smaller inner barrel with a reduced amount of acoustic treatment to be used, while also reducing the overall weight of the turbofan engine. Moreover, elongating the fan case along the axial centerline of the turbofan engine enables a continuous sheet of acoustic lining to be positioned therein, thereby improving the acoustic dissipation of noise generated by the turbofan engine.

FIG. 1 is a schematic illustration of an exemplary turbofan engine 10 including a fan assembly 12, a low pressure or booster compressor 14, a high-pressure compressor 16, and a combustor assembly 18. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 via a first drive shaft 28, and high-pressure turbine 20 is coupled to high-pressure compressor 16 via a second drive shaft 30. Turbofan engine 10 has an intake 32 and an exhaust 34. Turbofan engine 10 further includes a centerline 36 about which fan assembly 12, booster compressor 14, high-pressure compressor 16, and turbine assemblies 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
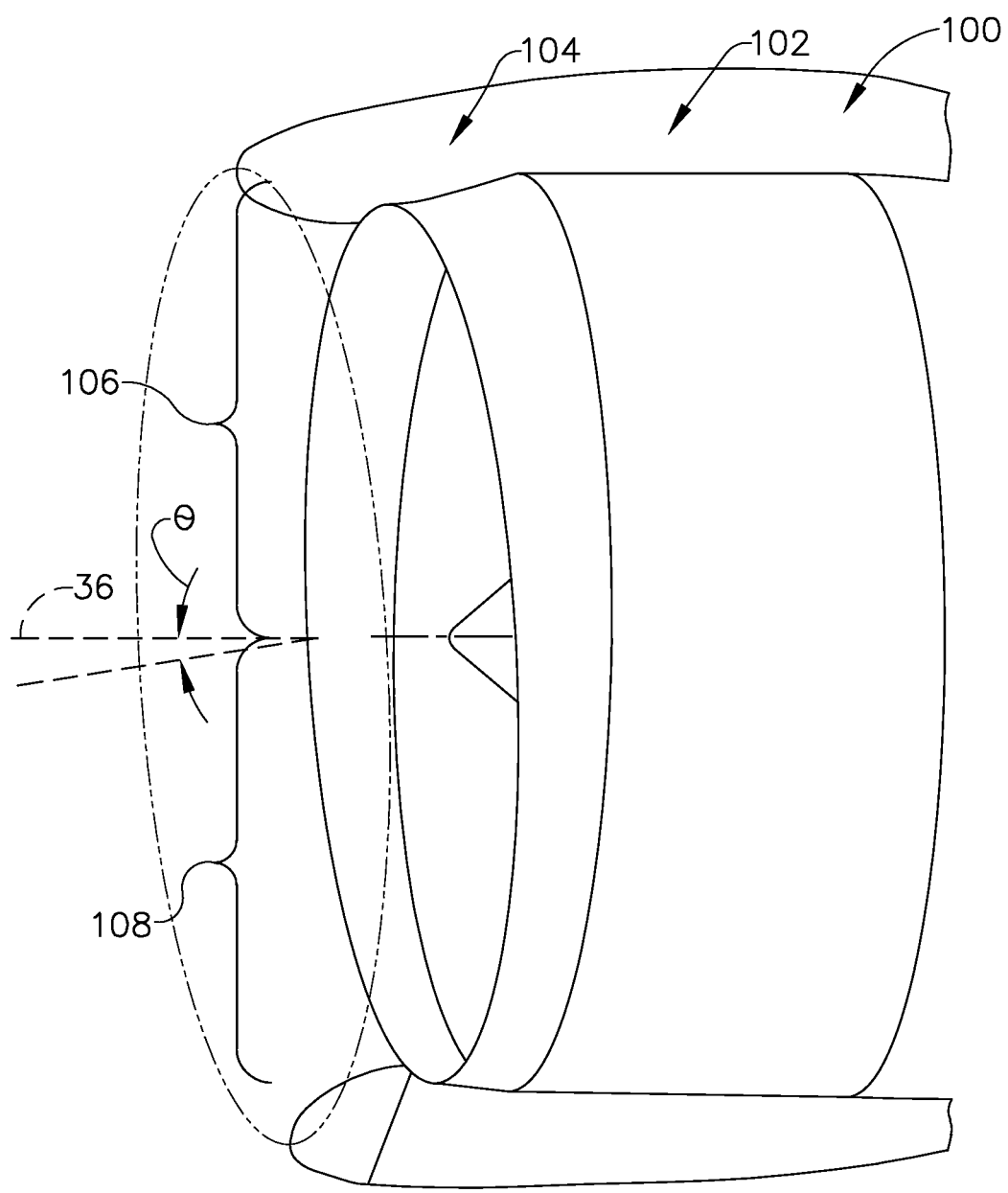
FIG. 2 is a perspective view of an exemplary fan case that may be used in the turbofan engine shown in FIG. 1.

FIG. 2 is a perspective view of an exemplary fan case 100 that may be used in turbofan engine 10 (shown in FIG. 1). In the exemplary embodiment, fan case 100 includes an aft portion 102 and a forward portion 104 extending from aft portion 102. Aft portion 102 is substantially cylindrical and axi-symmetric about centerline 36 of turbofan engine 10 (each shown in FIG. 1), and a cross-sectional shape of forward portion 104 progressively decreases in radial size as forward portion 104 extends from aft portion 102. More specifically, forward portion 104 is shaped to define a drooped inlet of turbofan engine 10, as will be described in more detail below.

In the exemplary embodiment, forward portion 104 includes a first arcuate portion 106 and a second arcuate portion 108. First arcuate portion 106 is defined as a circumferential section of forward portion 104 extending between about the 270° and 90° marks of forward portion 104 when turbofan engine 10 is viewed axially along centerline 36. Similarly, second arcuate portion 108 is defined as a circumferential section of forward portion 104 extending between about the 90° and 270° marks of forward portion 104 when turbofan engine 10 is viewed axially along centerline 36. As such, first arcuate portion 106 is generally defined as an upper portion of forward portion 104, and second arcuate portion 108 is generally defined as a lower portion of forward portion 104. At least a portion of first arcuate portion 106 extends a greater distance from aft portion 102 than second arcuate portion 108 such that a droop angle $\Theta$ is defined at intake 32 of turbofan engine 10. In one embodiment, droop angle $\Theta$ is less than about 10 degrees relative to a centerline of fan case 100, which generally corresponds to centerline 36 of turbofan engine 10.

Figure 3:
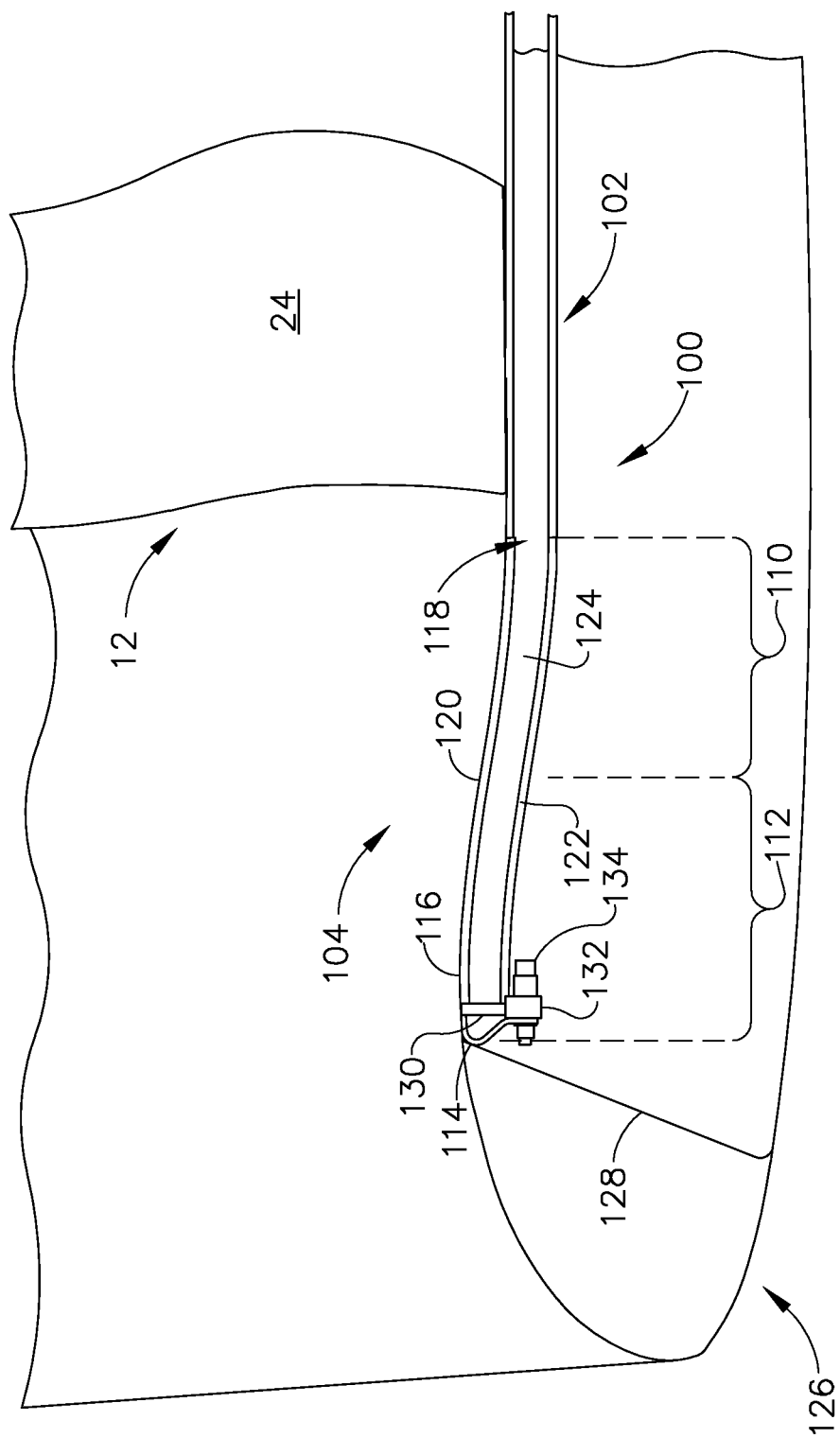
FIG. 3 is a cross-sectional side view illustration of an exemplary portion of the fan case shown in FIG. 2.

FIG. 3 is a cross-sectional side view illustration of an exemplary portion of fan case 100. In the exemplary embodiment, and as described above, forward portion 104 progressively decreases in radial size as forward portion 104 extends from aft portion 102. More specifically, when viewed from interior of fan case 100, forward portion 104 has a sweeping profile that progressively transitions from a concave shape to a convex shape as forward portion 104 extends from aft portion 102. For example, forward portion 104 includes a concave portion 110 extending from aft portion 102, and a convex portion 112 extending from concave portion 110 towards a leading edge 114 of forward portion 104. As such, flow separation at a flow surface 116 of fan case 100 of a flow of air channeled towards fan blades 24 is reduced.

Fan case 100 also includes an interior cavity 118 defined between a radially inner wall 120 and a radially outer wall 122. In the exemplary embodiment, elongating fan case 100 relative to centerline 36 (shown in FIG. 1) enables a sheet 124 of acoustic lining to extend continuously between aft portion 102 and forward portion 104. An exemplary acoustic lining material includes, but is not limited to, a honeycomb structure formed from composite material. Extending sheet 124 of acoustic lining continuously between aft portion 102 and forward portion 104 facilitates improving the acoustic dissipation of noise generated by turbofan engine 10, when compared to the acoustic dissipation capable of being achieved by truncated sheets of acoustic lining.

In some embodiments, sheet 124 of acoustic lining is selectively removable from interior cavity 118 to facilitate removal of individual fan blades 24 from turbofan engine 10. Previously, an inlet structure incorporating a drooped inlet was selectively removable from the turbofan engine to enable individual fan blades to be removed therefrom. Progressively decreasing the radial size of forward portion 104 facilitates restricting the axial movement of fan blades 24 towards intake 32. As such, sheet 124 of acoustic lining is selectively removable from interior cavity 118 to reduce the radial height of fan case 100, and to enable fan blades to be translated axially towards intake 32.

Moreover, in the exemplary embodiment, turbofan engine 10 includes a nacelle housing 126, and fan case 100 is coupled to nacelle housing 126. Nacelle housing 126 includes a forward bulkhead 128 positioned therein. By omitting one or more components from nacelle housing 126, forward portion 104 of fan case 100 is capable of extending from aft portion 102 towards forward bulkhead 128. For example, in one embodiment, leading edge 114 of forward portion 104 is coupled to forward bulkhead 128. Moreover, forward portion 104 of fan case 100 is positioned upstream of fan assembly 12.

Figure 4:
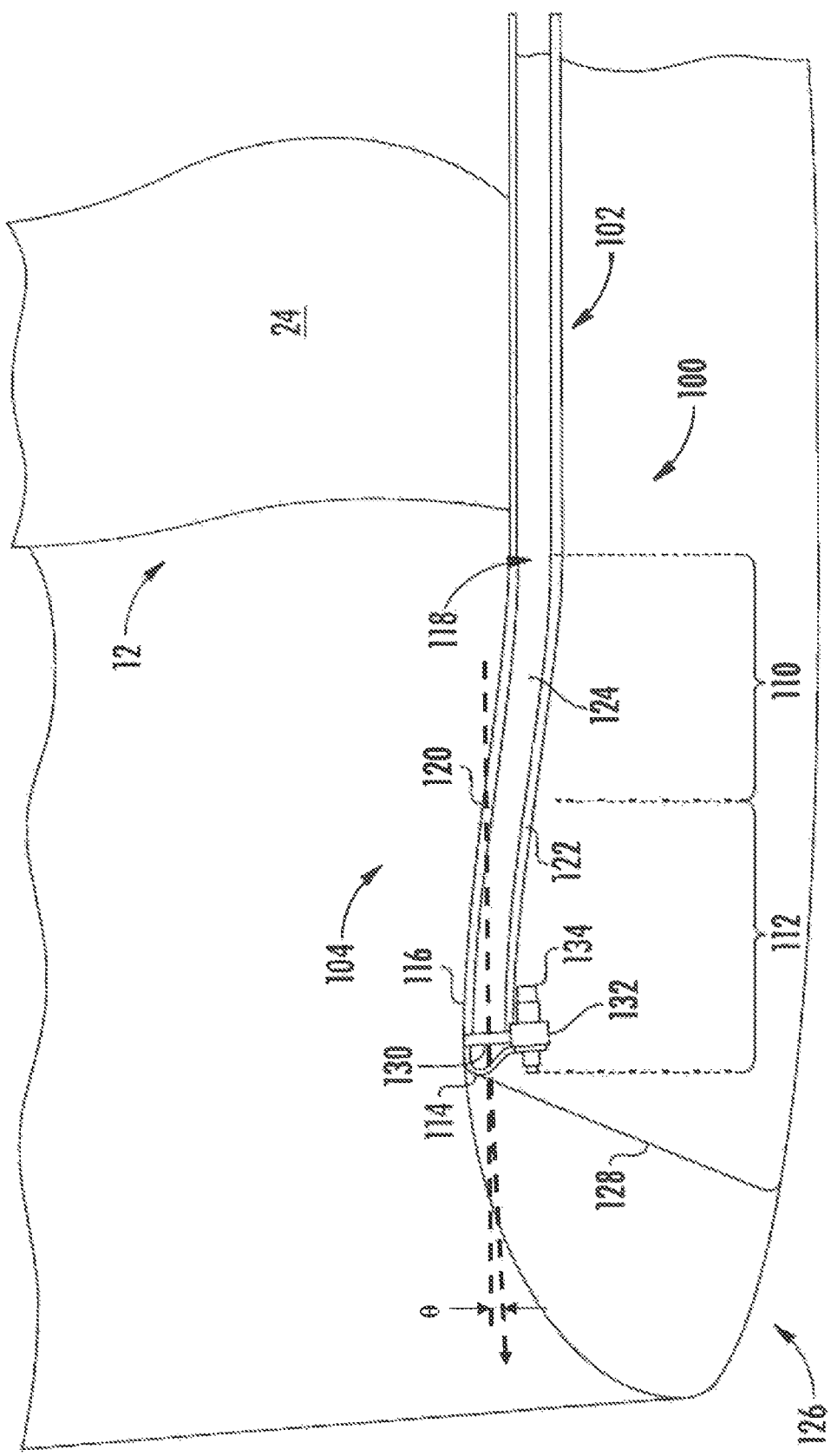
FIG. 4 is a cross-sectional side view illustration of the fan case shown in FIG. 2 according to another embodiment.

Nacelle housing 126 also includes a first attachment flange 130 for coupling to a second attachment flange 132 positioned at leading edge 114 of forward portion 104. More specifically, first attachment flange 130 extends radially outward from a radially inner wall 120 of nacelle housing 126 for coupling to second attachment flange 132. Alternatively, first attachment flange 130 extends from forward bulkhead 128 for coupling to second attachment flange 132. Coupling first attachment flange 130 to second attachment flange 132 enables a fastener 134 to be extended therethrough, thereby securing fan case 100 to nacelle housing 126. Moreover, in one embodiment, as shown in FIG. 4, first and second attachment flanges 130 and 132 extend obliquely relative to centerline 36 such that they are aligned with droop angle Θ. That is, the front surfaces of the first and second attachment flanges 130, 132 face a direction that makes a droop angle with a direction of the centerline 36 of the turbofan engine 10.

An exemplary technical effect of the methods, systems, and apparatus described herein includes at least one of: (a) reducing the length to diameter ratio of a turbofan engine; (b) reducing the overall weight of a turbofan engine; and (c) improving the acoustic dissipation capabilities of acoustic lining positioned within a turbofan engine.

Exemplary embodiments of a fan case for use in a turbofan engine are described above in detail. The fan case is not limited to the specific embodiments described herein, but rather, components of systems and/or steps of the methods may be utilized independently and separately from other components and/or steps described herein. For example, the fan case may also be used in combination with other systems that would benefit from reducing the length of a nacelle housing, and are not limited to practice with only the systems and methods as described herein. Rather, the exemplary embodiment can be implemented and utilized in connection with many other aerospace applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbofan engine comprising:
    a nacelle housing; and
    a fan case coupled to said nacelle housing, said fan case comprising:
        an aft portion that is substantially cylindrical and axi-symmetric about a centerline of the turbofan engine;
        a forward portion extending from said aft portion, wherein a cross-sectional shape of said forward portion progressively decreases in radial size as said forward portion extends from said aft portion, said forward portion further defining concave portion extending from said aft portion and a convex portion extending from said concave portion;
        a radial inner wall, a radial outer wall and an interior cavity defined between the radial inner wall and the radial outer wall;
        a leading edge of the forward portion extending between the radial inner wall and radial outer wall;
        a sheet of acoustic lining extending continuously from said aft portion at a location radially outward of a plurality of fan blades of the turbofan engine to the convex portion of said forward portion; and
        an attachment flange at the forward portion, the attachment flange positioned aft of the leading edge of the forward portion,
    wherein the sheet of acoustic lining is selectively removable from the interior cavity to thereby reduce the radial height of the fan case,
    wherein the forward portion comprises a first arcuate portion and a second arcuate portion,
    wherein at least a portion of the first arcuate portion extends a greater distance from the aft portion than the second arcuate portion such that a droop angle is formed with respect to the centerline at the intake, and
    wherein the attachment flange extends obliquely relative to the centerline such that a direction orthogonal to a front surface of the attachment flange is aligned with the droop angle.

2. The turbofan engine in accordance with claim 1 further comprising a forward bulkhead positioned within said nacelle housing, wherein said forward portion of said fan case extends from said aft portion towards said forward bulkhead.

3. The turbofan engine in accordance with claim 2, wherein a leading edge of said forward portion is coupled to said forward bulkhead.

4. The turbofan engine in accordance with claim 1, wherein said nacelle housing comprises a second attachment flange for coupling to the attachment at the forward portion.

5. The turbofan engine in accordance with claim 1, further comprising a fan assembly positioned within said nacelle housing, wherein said forward portion of said fan case is positioned upstream from said fan assembly.

6. The turbofan engine in accordance with claim 1, wherein an entirety of said first arcuate portion extends a greater distance from said aft portion than an entirety of said second arcuate portion.

7. The turbofan engine in accordance with claim 6, wherein said droop angle is less than about 10 degrees relative to the centerline of said fan case.

8. The turbofan engine in accordance with claim 6, wherein said nacelle housing comprises a second attachment flange for coupling to the attachment flange at the forward portion.

9. The turbofan engine in accordance with claim 1, wherein, when viewed from interior of said fan case, said forward portion comprises a sweeping profile that progressively transitions from a concave shape at the concave portion to a convex shape at the convex portion as said forward portion extends from said aft portion.

10. A method of assembling a turbofan engine, said method comprising:
    providing a fan case that includes
        an aft portion that is substantially cylindrical and axi-symmetric about a centerline of the turbofan engine,
        a forward portion extending from the aft portion, a radial inner wall,
        a radially outer wall and an interior cavity defined between the radial inner wall and the radial outer wall,
        a leading edge of the forward portion extending between the radial inner wall and radial outer wall,
        said forward portion further defining concave portion extending from said aft portion and a convex portion extending from said concave portion; and positioning a sheet of acoustic lining within the fan case extending continuously from said aft portion at a location radially outward of a plurality of fan blades of the turbofan engine and to the convex portion of forward portion;

wherein a cross-sectional shape of the forward portion progressively decreases in radial size as the forward portion extends from the aft portion and further wherein the sheet of acoustic lining is selectively removable from the interior cavity to thereby reduce the radial height of the fan case; and coupling the forward portion of the fan case to a nacelle housing utilizing an attachment flange at the forward portion, the attachment flange positioned aft of the leading edge of the forward portion, wherein the forward portion comprises a first arcuate portion and a second arcuate portion, wherein at least a portion of the first arcuate portion extends a greater distance from the aft portion than the second arcuate portion such that a droop angle is formed with respect to the centerline at the intake, and wherein the attachment flange extends obliquely relative to the centerline such that a direction orthogonal to a front surface of the attachment flange is aligned with the droop angle.

11. The method in accordance with claim 10, wherein coupling the forward portion comprises coupling a second attachment flange of the nacelle housing to the attachment flange at the forward portion.

12. The method in accordance with claim 11, wherein an entirety of said first arcuate portion extends a greater distance from said aft portion than an entirety of said second arcuate portion.

13. The method in accordance with claim 10, wherein coupling the forward portion comprises extending the forward portion of the fan case towards a forward bulkhead positioned within the nacelle housing.

14. The method in accordance with claim 13, wherein extending the forward portion comprises coupling a leading edge of the forward portion to the forward bulkhead positioned within the nacelle housing.

* * * * *